United States Patent

Welch

[15] 3,645,162

[45] Feb. 29, 1972

[54] COUPLING MEMBER

[72] Inventor: Philip C. Welch, Grand Rapids, Mich.

[73] Assignee: Modular Systems, Inc., Fruitport, Mich.

[22] Filed: Mar. 6, 1970

[21] Appl. No.: 17,241

[52] U.S. Cl.................................85/4, 287/20.925, 85/8.6, 151/41.73, 52/285
[51] Int. Cl.......................................F16b 5/07, F16b 35/04
[58] Field of Search.................287/20.924, 20.925, 20.926, 287/20.927, 20.92 C, 20.92 R, 20.92 G; 52/285; 85/4, 20, 39, 28, 41, 8.6; 151/41.73, 20

[56] References Cited

UNITED STATES PATENTS

| | | | |
|---|---|---|---|
| 1,250,597 | 12/1917 | Kyle | 85/41 |
| 3,160,189 | 12/1964 | Hughes | 151/41.73 |
| 3,332,182 | 7/1967 | Mark | 287/20.92 R X |
| 3,434,521 | 3/1969 | Flora | 151/41.73 |
| 3,462,114 | 8/1969 | O'Dell, Sr. et al. | 85/4 X |
| 3,512,328 | 5/1970 | Eriksson | 85/4 X |

FOREIGN PATENTS OR APPLICATIONS 573,285    3/1959    Canada..............................151/41.73

*Primary Examiner*—David J. Williamowsky
*Assistant Examiner*—Wayne L. Shedd
*Attorney*—Price, Heneveld, Huizenga & Cooper

[57] ABSTRACT

This disclosure relates to a coupling member for securing the butt ends of two panels to a central panel, and to the joint structure formed therewith. The coupling member is formed from first and second elongated members, the first elongated member having a tubular portion with internal and external threads, and an opposite end having a radial shoulder to abut the sides of a panel and an expanded head spaced therefrom. The second elongated member forming the coupling member has at one end a threaded stud to be received within the first elongated member tubular portion and at the other end a radial shoulder and an expanded head spaced therefrom. In the joint formed with the coupling member, the expanded heads engage flexible and resilient clips having slots to receive the ends of the coupling members and the clips are fixed within recesses in butt ends of two panels. The joints thus formed are flexible and hidden from view.

10 Claims, 3 Drawing Figures

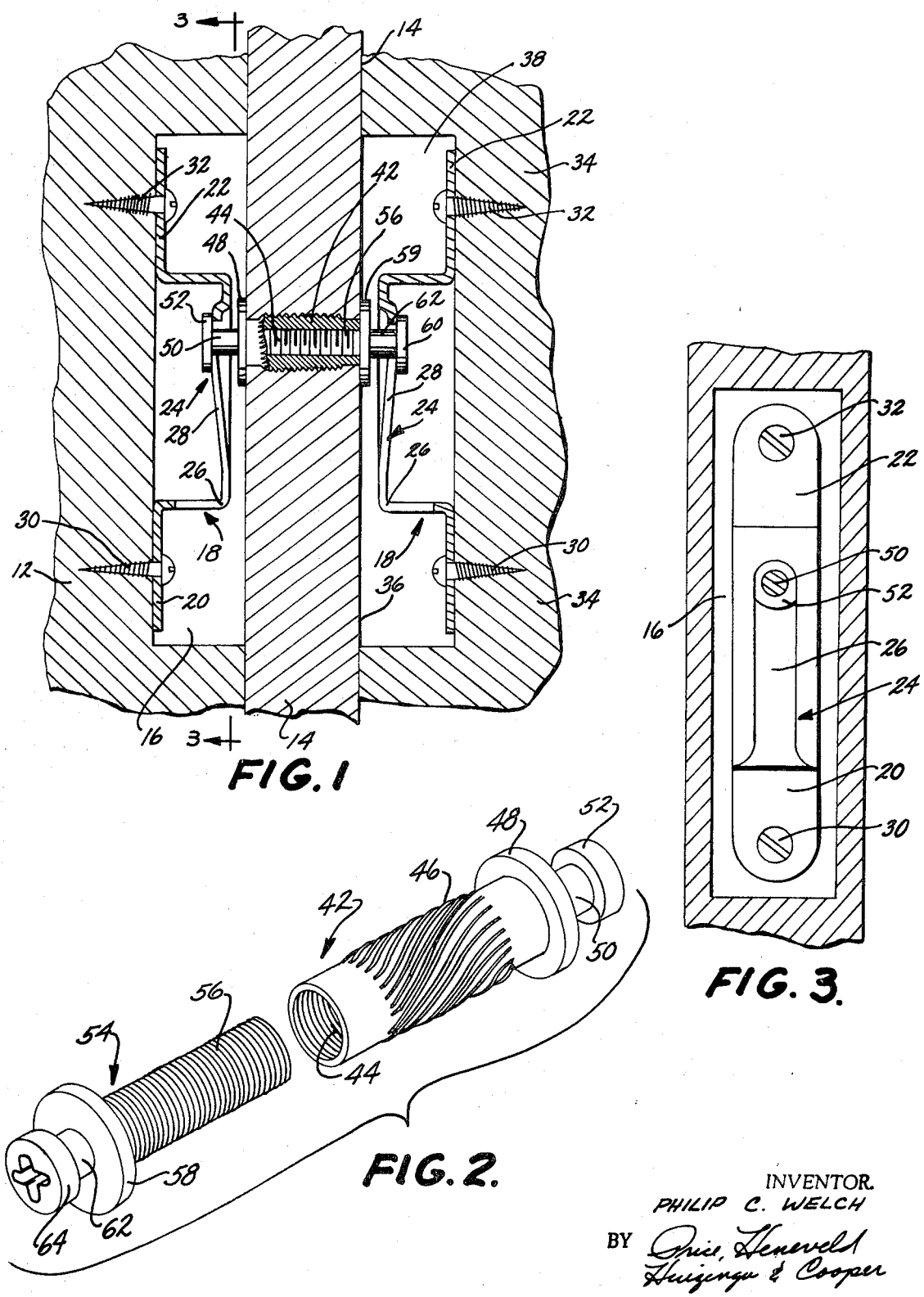

COUPLING MEMBER

DISCLOSURE

This invention relates to coupling members for joining three members together and to the joints formed therewith. In one of its aspects, the invention relates to a coupling member formed of first and second elongated members having means for threadably engaging each other, each of the elongated members having an expanded end portion and a radial shoulder spaced inwardly thereof.

In another of its aspects the invention relates to a coupling member formed of first and second elongated members wherein one of the elongated members has a tubular end threadably receiving the other elongated member, and also has external threads for engaging a bore of a panel.

In still another aspect, the invention relates to a joint between the butt ends of two panels and a central panel therebetween, the butt ends of each panel having a recess and a flexible and resilient, slotted clip therein, each of the clips is engaged by the head of a coupling member which extends through the bore in the central panel, the coupling member being formed from first and second elongated members which are releasably secured together within the bore.

In U.S. Pat. No. 3,451,362 and in copending U.S. Pat. application Ser. No. 733,047 filed May 29, 1968 there is disclosed and claimed a system for joining two wall members together through flexible clips which are recessed in one of the panels. This is a highly desirable joint because the recessed nature of the fastening means hides the fastening members from view. This is also advantageous because the fastening means can be installed in a factory, shipped knockdown, and then assembled without tools at destination. This results in a saving of shipping costs while producing a professionally finished piece of furniture. The joints are superior in many respects to conventional joints because the flexible and resilient nature of the clips maintains the joints under spring tension to permit expansion and contraction of the joints under differing moisture conditions.

The joints of said patent and patent application have been quite successful in telephone booths, cabinets and the like. Occasionally it is desirable to gang booths and cabinets together. Heretofore, the booths have been ganged together by installing two complete booths side by side. This construction appears cumbersome and is wasteful in that an extra wall panel is used.

It has been proposed by Budai in U.S. Pat. No. 2,708,292 to fasten the butt ends of two panels on opposite sides of a post by employing threaded connectors in the post which engage slotted clips within recessed portions of the panel ends. In the type of joints disclosed in said U.S. Pat. No. 3,451,362 and Patent application, the two wall members are drawn tightly in contact with each other due to the construction of the clips and the spacing of the connectors. The panels normally employed in most constructions do not have sufficient thickness of wood to enable a strong enough connection between the central panel and the screw connector to enable the Budai joint to work for the type of joints disclosed and claimed in said Patent and Patent application.

I have now discovered that the strong and flexible joint structures of said U.S. Pat. No. 3,451,362 and said patent application can be employed in joining the butt ends of two side panels to a central panel therebetween by using in the central panel a coupling member having ends which engage clips in recessed portions of the two side panels, wherein the coupling member is formed of two parts which are releasably joined together within a bore of the central panel. By this construction the required strength is provided to hold both of these side panels tightly against the central panel under spring tension.

By various aspects of this invention one or more of the following, or other, objects can be obtained.

It is an object of this invention to provide an improved coupling member for joining the butt ends of two panels to a central panel.

It is a further object of this invention to provide concealed flexible and resilient joints between a central panel and abutting side panels.

It is a further object of this invention to provide a coupling member for joining the ends of two panels to a central panel wherein the coupling member is tightly secured to the central panel and its strength is independent of the strength of the panel.

It is yet another object of this invention to provide a coupling member for securing three panels together with hidden flexible and resilient joints in which the panel members are pulled tightly together.

It is still another object of this invention to provide a coupling member for engaging fastening members on either side of a panel, each side of the coupling member being tightly secured together and to the panel.

Other aspects, objects, and the several advantages of this invention are apparent to one skilled in the art from a study of this disclosure, the drawings, and the appended claims.

According to the invention, there is provided a coupling member for joining the butt ends of two wall members to a central panel. The coupling member is formed from a first elongated member having a threaded axial bore at one end and an expanded head fixed at the other end. A radial shoulder is spaced from the head between the head and the bore. A second elongated member has a threaded end sized to threadably engage the axial opening of the first member and a head opposite the threaded end with a radial shoulder spaced inwardly from the head. The first elongated member further has an outer surface for threadably engaging the bore.

Further, according to the invention, there is provided a joint structure formed between a central panel having opposing sides and first and second wall members having end portions in abutting relationship with the opposing sides of the central panel. Each of the end portions of the wall members has recesses containing a slotted clip. A bore is formed in the central panel and a coupling member is positioned within the bore. The coupling member is formed from first and second elongated members and has means releasably securing these first and second members together. An outer portion of the first elongated member extends into the recess of the first wall member and through the slot in the clip within that recess. An expanded head on the end of the first elongated member is beneath the clip so that the elongated member is engaged and retained by the clip in the first wall member. The second elongated member has an outer portion extending into the recess of the second wall member and through the slot in the clip in the second wall member recess. An expanded head on the end of the second elongated member is positioned beneath the clip whereby the second elongated member is engaged and retained by the clip in the second wall member.

The invention will now be described with reference to the accompanying drawings in which:

FIG. 1 is a sectional view of a joint construction according to the invention employing the novel coupling member;

FIG. 2 is an enlarged, exploded perspective view of the novel coupling member illustrated in FIG. 1; and FIG. 3 is a sectional view taken along line 3—3 of FIG. 1.

Referring now to the drawings, there is shown a first wall member 12 having an edge 14 and a pocket 16 formed therein. A clip 18 has end flanges 20 and 22 and a raised central portion 24 containing a slot 26. Wedging surfaces 28 are formed alongside of the slot 26. The clip 18 is secured in the bottom of the pocket 16 by screws 30 and 32 which extend through end flanges 20 and 22 respectively. The clip structure per se is more fully described in said copending U.S. Patent application Ser. No. 733,047 filed May 29, 1968. This patent application is incorporated herein by reference.

A second wall member 34 has an edge 36 with a pocket 38. A clip 18 identical with the clip in the pocket 16 is secured within the bottom of the pocket 38 by screws 30 and 32.

A central panel 40 has opposing planar sides which are in abutting relationship with edges 14 and 36 of first wall member 12 and the second wall member 34, respectively. The central panel 40 has a bore extending therethrough, receiving a coupling member which engages each clip 24 in its respective wall member.

The coupling member is formed from a first elongated member 42 and a second elongated member 54. The first elongated member has a tubular end which is internally threaded at 44 and externally threaded at 46. The pitch of the threads 46 are opposite the pitch of the threads 44. At the other end of the first elongated member there is provided a radial shoulder 48 and an expanded head 52 which are spaced from each other by shank 50.

The second elongated member 54 has a threaded end which is threadably received within the tubular end of the first elongated member. At the other end of the second elongated member there is formed a radial shoulder 58, which abuts against the outer edge of the central panel 40, and an expanded head 60 which is spaced from the shoulder 48 by a shank 62. Expanded head 60 has a screwdriver slot 64. Expanded head 52 also has a screwdriver slot (not shown).

In operation, the first elongated member 42 is inserted into the bore of the central panel 40. This first elongated member threadably engages the bore through the external threads 46 on the tubular end of this first elongated member. A screwdriver can be used to screw this first elongated member into the bore or a hammer can be used to force the elongated member 42 into the bore. The first elongated member 42 is inserted into the bore until the radial shoulder 48 abuts against the outer surface of the central panel 40. The second elongated member is then inserted into the bore from the other side of the central panel 40 and threadably engages the first elongated member through the threaded portion 56. The second elongated member is then tightened so that the radial shoulder 58 abuts against the outer edge of the panel 40 thereby drawing the first and second elongated members together. Since the threads 46 are opposite in pitch from the threads 44, the tightening of the second elongated member 54 will further tighten the first elongated member 42 within the bore.

The first wall member 12 can then be attached by bringing the edge 14 in contact with the edge of the central panel 40 such that the expanded head 52 extends into the slot 16. The first wall member 12 is then slid downwardly with respect to the central panel 40 so that the shank 50 enters the slot 26 with the expanded head 52 beneath the raised central portion 24. As the first wall member 12 moves downwardly further, the wedging surfaces 28 bear against the expanded head thereby pulling the central panel 40 and the first wall member 12 into tight contact with each other. The clip 18 is made from a strong, flexible and resilient material, such as spring steel, so that the clip will flex resiliently as the first wall member 12 and the central panel 40 are pulled tightly into engagement with each other. By this construction, the joint is maintained under a spring tension which will expand and contract with moisture conditions within the panel.

The second wall member 34 is joined to the central panel 40 in a similar manner. Namely, the second wall panel is brought in contact with the central panel 40 with the head 30 of the second elongated member projecting into the pocket 38. The second wall member 34 is then slid downwardly with respect to the central panel 40 until the shank 62 enters the slot 26 with the expanded head 60 beneath the raised central portion 24. Continuation of the sliding motion of the second wall member 34 pulls the second wall member into tight contact with the central panel 40 in a manner which has been described hereinbefore.

The joint can also be constructed by sliding the central panel between the first and second wall members which are relatively fixed in place. In this operation, the first and second wall members can be fixed to move toward and away from each other. These wall members are then opened to fit the central panel therebetween so that the heads 52 and 60 project into the pockets or recesses 16 and 38. The wall members 12 and 34 are then pushed into contact with the central panel 40. The three panels are then secured tightly together by pulling the central wall panel upwardly with respect to the wall members 12 and 36. In the event the wall members 12 and 34 are vertically supported, the clips 18 can be inverted from the position shown in the drawing so that the closed end of the slot 26 will be below the open end of the clip. There will be no danger of the central panel sliding downwardly with respect to the side panels 12 and 34.

The coupling member of the invention provides a simple and economic means by which the butt end of two side panels can be joined to a central panel whereby the joint structures formed therebetween will be recessed and hidden from view and will be strong and resilient to allow for expansion and contraction of the joints.

The coupling member is strong, and its strength depends upon the strength of the metal, not upon the strength of the wood or other material in which it is positioned. In other words, the first and second coupling members, being secured together, across the panel 40, provide substantial strength for the joints formed between the wall members and the central panel.

Whereas the invention has been described with reference to a particular clip 18, it is within the scope of the invention to use other forms of clips in connection with the connecting members. For example, the clips disclosed and claimed in U.S. Pat. No. 3,451,362 could also be employed in the joints formed with the novel connectors according to the invention. Also, the locking clips disclosed and claimed in said copending U.S. Patent application can also be employed.

With the use of the coupling member according to the invention in combination with the flexible and resilient clips described above, the joint is quickly assembled without regard to adjustment of the heads 52 and 60 for engaging the clips. The clips are flexible in nature so that any minor adjustments are taken up by the flexing of the clips. The two portions of the coupling member are thus secured to the panel 14 quickly by joining the members tightly together without regard to tolerances.

Reasonable variation and modification are possible within the scope of the foregoing disclosure, the drawings, and the appended claims without departing from the spirit of the invention.

The embodiments of the invention in which an exclusive property or privilege is claimed are defined as follows.

1. A coupling member for joining the butt ends of two wall members to a central panel, said coupling member comprising:
   a first elongated member having a threaded axial bore at one end, an expanded head fixed at the other end of said first elongated member, and a radial shoulder spaced from said head between said head and said bore; and
   a second elongated member having a threaded end sized to threadably engage said axial opening of said first elongated member, a expanded head at an end opposite said threaded end, and a radial shoulder spaced inwardly from said second elongated member expanded head.

2. A coupling member according to claim 1 wherein said first elongated member further comprises means on said outer surface for threadably engaging a bore.

3. A coupling member according to claim 2 wherein said thread means on the outer surface of said first elongated member are opposite in pitch to the pitch of the threads within said axial opening.

4. A coupling member according to claim 3 wherein said head of said second elongated member contains a tool-engaging means so that a tool can be employed to tightly secure said first and second elongated members together.

5. A coupling member according to claim 1 wherein said head of second elongated member contains a tool-engaging means so that a tool can be employed to tightly secure said first and second elongated members together.

6. A coupling member for joining the butt ends of two wall members to a central panel of relatively narrow width, said coupling member comprising;

a first elongated member having a threaded axial bore at one end and an expanded head at the other end; the outer surface of said first elongated member being threaded at said one end to engage a bore in said central panel; and a second elongated member having a threaded end for threadably engaging said axial bore of said first elongated member; and an expanded head on an opposite end of said second elongated member.

7. A coupling member according to claim 6 wherein the threads on the outer surface of said first elongated member are pitched opposite to the threads within said axial bore of said first elongated member.

8. A coupling member according to claim 6 wherein said first elongated member has a radial shoulder spaced inwardly of said expanded head, and said second elongated member has a radial shoulder spaced inwardly of said second elongated member expanded head.

9. A coupling member according to claim 6 wherein said second elongated member expanded head has a tool-engaging slot at 10. A coupling member according to claim 9 wherein said first elongated member expanded head has a tool-engaging slot at an outer end thereof.

* * * * *

17,241

PO-1050
(5/69)

UNITED STATES PATENT OFFICE
CERTIFICATE OF CORRECTION

Patent No. 3,645,162     Dated February 29, 1972

Inventor(s) Philip C. Welch

It is certified that error appears in the above-identified patent and that said Letters Patent are hereby corrected as shown below:

Column 6, line 8;

After "at" add --- an outer end thereof. ---

Signed and sealed this 12th day of September 1972.

(SEAL)
Attest:

EDWARD M. FLETCHER, JR.
Attesting Officer

ROBERT GOTTSCHALK
Commissioner of Patents